J. Richardson,
Dry Dock.
No. 87,291.  Patented Feb. 23, 1869.
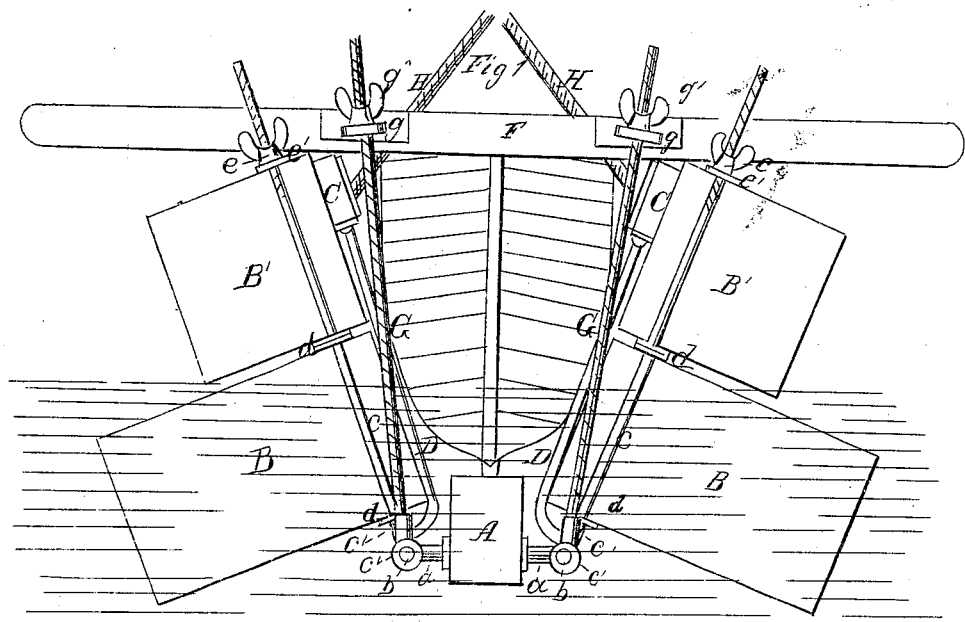
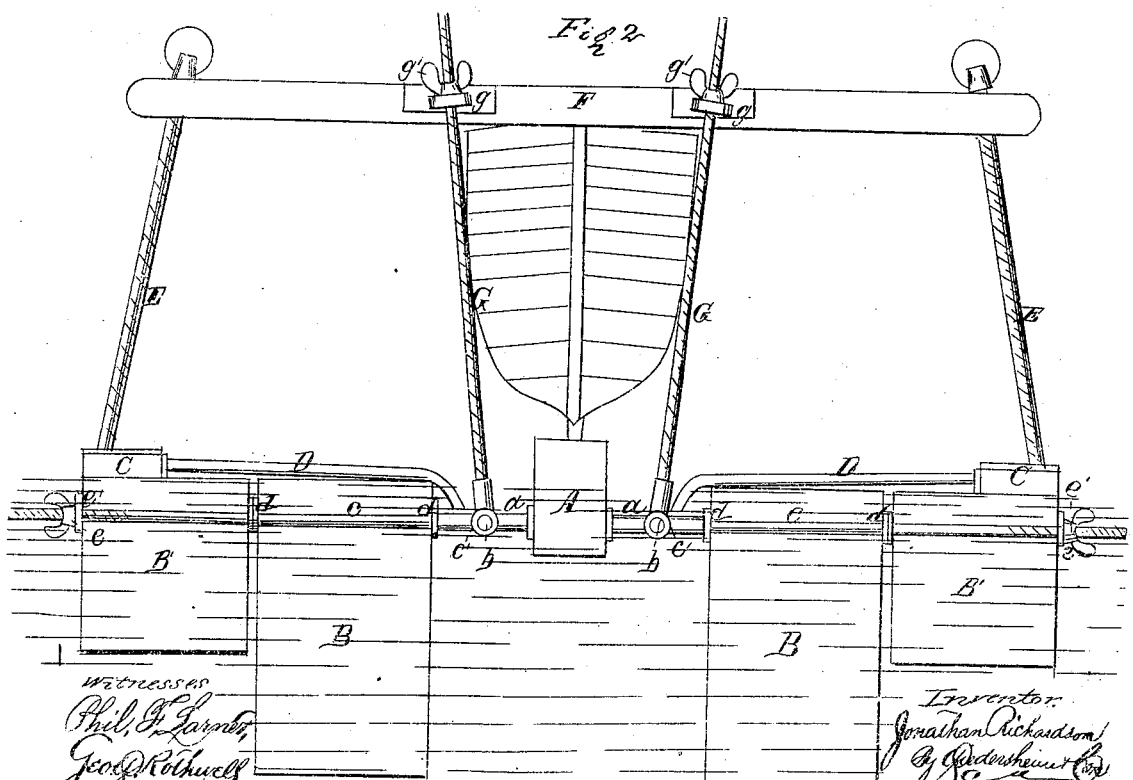

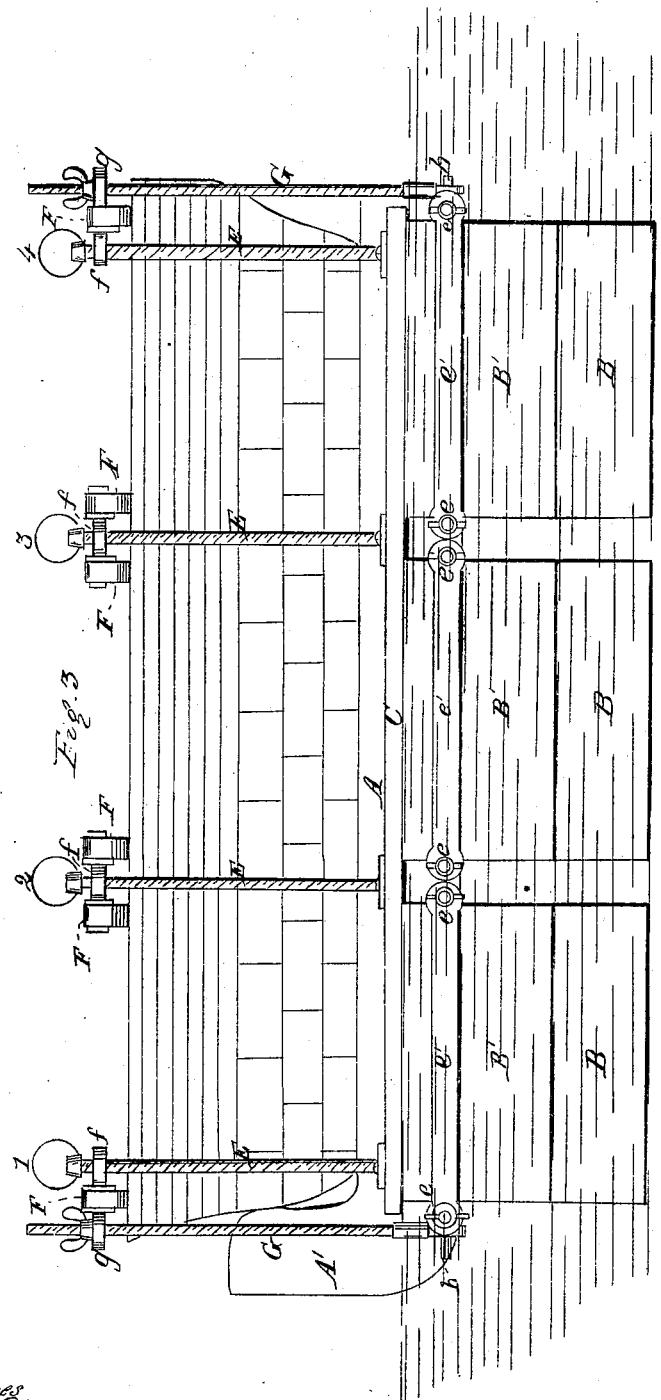

JONATHAN RICHARDSON, OF GERMANTOWN, VIRGINIA.

Letters Patent No. 87,291, dated February 23, 1869.

IMPROVED DRY-DOCK.

The Schedule referred to in these Letters Patent and making part of the same.

*To all whom it may concern:*

Be it known that I, JONATHAN RICHARDSON, of Germantown, in the county of Fairfax, and State of Virginia, have invented a new and useful Improved Dry-Dock; and I do hereby declare the following to be a full, clear, and exact description thereof, sufficient to enable those skilled in the art to which my invention appertains, to fully understand and use the same, reference being had to the accompanying drawings, forming part of this specification, and in which—

Figure 1, Sheet I, is an end elevation of my dry-dock, with a vessel on the ways, preparatory to the elevation of the vessel for repair.

Figure 2, Sheet I, a similar view, showing the vessel elevated.

Figure 3, Sheet II, is a side elevation of fig. 2.

My invention is an improved floating dry-dock, for elevating vessels for repairs. It can also be used to facilitate the passage of vessels over bars.

My object has been to improve the construction of dry-docks, so as to render them more simple, durable, and powerful, and capable of being worked with more economy of power than heretofore, and, at the same time, producing better results. To these ends, My invention consists, First, in hinging air-tight tanks to the opposite sides of a central beam, which also forms the keel.

Second, in connection with the hinged tanks, my invention consists in the employment of screws, so arranged, with relation to the hinged tanks, as to exert the most effective pressure thereon to sink them.

In order that others may so understand my improved dry-dock as to be able to construct and use the same, I will now proceed to describe it more fully in detail, with reference to the accompanying drawings, wherein similar letters indicate corresponding parts in the several figures.

In the drawings—

A represents a central bearing-beam, for the support of the vessel, and forming the keel of the dock, being made with a prow, A'.

$a$ $a'$ are eye-bolts, or brackets, fixed in the opposite sides of the beam A.

These bolts or brackets, $a$, support metallic rods, $b$.

$c$ $c$ are rods hung loosely on the rods $b$, by means of eyes $c'$. These rods $c$ are formed with screw-threads on their outer ends.

B B represent air-tight tanks, provided with eyes $d$, through which the rods $c$ pass loosely.

B' B' represent tanks similar to those just described, but smaller, and hung in the same manner on the rods $c$. These tanks are held in position by means of nuts $e$, and flat connecting-plates $e'$, fitted on to the outer ends of the rods $c$. It will be observed that similar series of the tanks B B' are arranged on each side of the keel A.

C represents a long plate of wood, resting on top the tanks B', and attached to rods D, which are hooked on to the rods $b$, to form a hinge.

These plates constitute bearing-surfaces for screws E, which work through nuts $f$, swivelled to the horizontal beams F. (The screws E are not shown in fig. 1.) These beams, when a vessel is in the dock, rest upon the deck of the same, and extend outward at each side, to a considerable distance from the vessel. The beams may be made double, as shown at 2 3, fig. 3, or single, as at 1 4, in the same representation.

G represents screw-rods, hinging on the fixed rods at the sides of the keel A, and working through nuts $g$, swivelled to the beams F. I purpose making these nuts $g$ adjustable longitudinally on the beams F, for a purpose to be hereinafter set forth.

H H, fig. 1, are screws, also working through nuts swivelled to the beams F, which are used to depress the tanks B B', to a certain extent.

I will now describe the mode of operating my dry-dock.

In order to receive a vessel on the ways, it is necessary that the latter be submerged to a level with the under side of the keel of the vessel. This is accomplished by unscrewing the nuts $e$, so as to lower the keel A, the parts being in the position represented in fig. 1. When this has been lowered a sufficient distance, the vessel is readily placed on the ways, the beams F adjusted across the decks, the rods G brought up into contact with the sides, as shown, and the nuts $g'$ screwed down so as to hold the vessel securely. The screws H are now brought into the position represented in fig. 1, bearing against the plate C, and turned in by any suitable means. The tanks B B' are thus gradually submerged, displacing the water, and thereby elevating the vessel. The screws H are only effective in depressing the tanks to a certain degree, and when this point is reached, the outer series of screws is brought to bear, the inner series abandoned, and the operation of forcing down the tanks is continued until a body of water equal to that formerly displaced by the vessel is displaced by the tanks, when, as a consequence, the vessel is lifted entirely from the water, and occupies the position shown in figs. 2 and 3. The upper surfaces of the tanks now form convenient platforms, on which the workmen may stand while engaged in caulking, painting, or otherwise repairing the vessel.

To replace the vessel again in the water after repairs, the rods E are unscrewed, and as this progresses, the tanks will rise naturally, on account of their buoyancy, until the position shown in fig. 1 is resumed. The nuts $e$ are now unscrewed, and the keel A descends until the vessel, freed from the restraint of rods and beams, is again afloat.

It will be observed that by arranging the depressing-screws, as described, they are brought to bear at the most effective points on the tanks, the two mechanical powers, the lever and screw, being most effectively combined.

The advantages of my dry-dock will be at once appreciated by those acquainted with the dry-docks now in use. Hitherto, floating dry-docks have been provided with tanks, which have been sunk by the weight of water pumped into them, and then pumped out to raise the tanks. This was, of course, a very slow operation, requiring a pumping-engine, and numerous other appliances, together with a large force of attendants to work them, thus entailing very heavy expenditures of money.

In contradistinction to all this, I provide floating dry-docks with air-tight tanks, conveniently arranged, and operated by means of screws, so situated as to exert, at all times, the most effective pressure against the tanks, to depress them. With my dry-dock there is no pumping of water first into, then out of the tanks, as they are depressed by means of screws, and elevated automatically, it only being necessary to relieve them from the pressure of the screws.

I desire here to state that this dry-dock may be employed with excellent effect to assist the passage of deep-draught vessels in shallow water, and over sand-bars, and other obstructions, the dock being operated the same as above described to raise the vessel, and then set in motion by any suitable means, transporting the vessel to deep water.

The advantages of this are obvious, and will be especially appreciated in times of war.

By fitting the depressing-screws to work through swivelled nuts, they are made capable of being turned up entirely out of the way.

Constructed as above described, a dry-dock is produced, which, for this class of structures, is remarkably simple, very durable, can be constructed at light comparative expense, and can be effectively operated in much less time, and with far greater economy, in men, money, and material, than those now in use.

Having thus described my invention,

What I claim as new, and desire to secure by Letters Patent, is—

1. In a dry-dock or lighter, the air-tight tanks, hinged to the opposite sides of a central beam or keel, substantially in the manner and for the purpose herein described.

2. The air-tight tanks B B', loosely fitted on the hinged rods $c$, and adjustable thereon, substantially as herein described, for the purpose set forth.

3. The double or single beams F, resting across the deck of the vessel, and connected with the fixed rods $b$ by hinged screw-rods G, operating substantially as and for the purposes herein described.

4. The plate C, resting on the tanks, and hinged to the side-rods $b$, forming the bearing-surface for the screws E H, substantially as herein set forth.

5. The depressing-screws H E, fitted to the beams F, and arranged substantially as described, to exert pressure on the tanks, substantially as herein set forth.

6. The combination of the hinged tanks B B', the keel A, screw-rods G, beams F, and depressing-screws, all operating substantially as herein set forth.

To the above specification of my dry-dock, I have signed my name, this 13th day of January, 1869, in the presence of two subscribing witnesses.

JONATHAN RICHARDSON.

Witnesses:
GEO. W. ROTHWELL,
SAMUEL S. BROWN.